(12) United States Patent
Maryaskin et al.

(10) Patent No.: US 10,057,730 B2
(45) Date of Patent: Aug. 21, 2018

(54) VIRTUAL PUSH-TO-TALK BUTTON

(71) Applicant: MOTOROLA SOLUTIONS, INC., Chicago, IL (US)

(72) Inventors: Evgeny Leonidovich Maryaskin, Saint Petersburg (RU); Ranjan Chatterjee, Kildeer, IL (US); Huitian Jiao, Schaumburg, IL (US); Wei Lin, Lake Zurich, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 9 days.

(21) Appl. No.: 15/552,874

(22) PCT Filed: May 28, 2015

(86) PCT No.: PCT/RU2015/000338
§ 371 (c)(1),
(2) Date: Aug. 23, 2017

(87) PCT Pub. No.: WO2016/190773
PCT Pub. Date: Dec. 1, 2016

(65) Prior Publication Data
US 2018/0077541 A1    Mar. 15, 2018

(51) Int. Cl.
*H04W 4/10*    (2009.01)

(52) U.S. Cl.
CPC ..................... *H04W 4/10* (2013.01)

(58) Field of Classification Search
CPC .................. H04W 4/10; H04B 2001/3861
USPC ................. 455/518, 519, 520, 517
See application file for complete search history.

(56) References Cited

U.S. PATENT DOCUMENTS

| | | | |
|---|---|---|---|
| 5,230,089 A | 7/1993 | Kindinger et al. |
| 5,315,639 A | 5/1994 | Lassers |
| 6,771,294 B1 | 8/2004 | Pulli et al. |
| 7,142,681 B2 | 11/2006 | Kortekaas |
| 8,087,302 B2 | 1/2012 | Boutros et al. |

(Continued)

FOREIGN PATENT DOCUMENTS

| | | |
|---|---|---|
| EP | 1643778 A2 | 4/2006 |
| JP | 2005293512 A | 10/2005 |

(Continued)

OTHER PUBLICATIONS

"Virtual Buttons in Augmented Reality. Part II", Augmented Reality Lab, http://www.arlab.com/blog/virtual-buttons-in-augmented-reality-part-ii/, posted on Jul. 30, 2012 by Jose Dolz, all pages.

(Continued)

*Primary Examiner* — John J Lee

(57) ABSTRACT

A method and apparatus for providing a virtual push-to-talk (PTT) button is provided herein. During operation, an augmented reality and object recognition circuitry will detect user's fingers and a free surface near the fingers by analyzing image captured by camera. A virtual PTT button is placed upon an object that is near to user's finger. Gesture recognition will be performed by the circuitry to determine if a user presses the virtual PTT button. When a user presses the virtual PTT button, the circuitry identifies the action and transmits a message to a PTT radio, causing the PTT radio to activate a PTT call.

4 Claims, 6 Drawing Sheets

(56) References Cited

U.S. PATENT DOCUMENTS

| | | |
|---|---|---|
| 8,380,128 B2 | 2/2013 | Higgins |
| 8,509,693 B2 | 8/2013 | Pinder et al. |
| 8,780,332 B2 | 7/2014 | Krah |
| 8,836,768 B1 | 9/2014 | Rafii et al. |
| 8,855,707 B2 | 10/2014 | Seguin et al. |
| 2006/0136201 A1 | 6/2006 | Landron et al. |
| 2006/0247925 A1 | 11/2006 | Haenel et al. |
| 2007/0178950 A1 | 8/2007 | Lewis et al. |
| 2011/0227820 A1 | 9/2011 | Haddick et al. |
| 2012/0289227 A1* | 11/2012 | Dhodapkar ......... H04L 12/1827 455/435.1 |
| 2013/0109425 A1 | 5/2013 | Kerger et al. |
| 2013/0209109 A1 | 8/2013 | Georgiano et al. |
| 2013/0335573 A1 | 12/2013 | Forutanpour et al. |
| 2014/0198129 A1 | 7/2014 | Liu et al. |
| 2014/0306877 A1 | 10/2014 | Katz et al. |
| 2015/0195687 A1* | 7/2015 | Alansky ................ H04W 4/10 455/518 |

FOREIGN PATENT DOCUMENTS

| | | |
|---|---|---|
| JP | 2009159402 | 7/2009 |
| WO | 2001054110 A1 | 7/2001 |
| WO | 2007011327 A1 | 1/2007 |
| WO | 2014030902 A1 | 2/2014 |
| WO | 2014164165 A1 | 10/2014 |

OTHER PUBLICATIONS

The International Search Report and the Written Opinion, corresponding patent application No. PCT/RU2015/000338 filed May 28, 2015, all pages.

* cited by examiner

VIRTUAL PUSH-TO-TALK BUTTON

FIELD OF THE INVENTION

The present invention generally relates to push-to-talk communications, and in particular, to a virtual push-to-talk button.

BACKGROUND OF THE INVENTION

Push-to-talk (PTT) devices are commonly employed by public safety personnel, air traffic controllers, emergency workers, construction site workers, and others who need to be in constant and readily available voice communication. PTT, also known as press-to-transmit, is a method of communicating using half-duplex communication lines. A PTT button may be pressed to switch a device from a voice reception mode to a transmit-mode. For example, one operator may depress the PTT button on her device and speak into the device's microphone. The speech is converted into an appropriate format and transmitted to one or more other devices, where the operators of those other devices hear the first operator speak through their device's speaker.

Oftentimes requiring an individual to push an actual PTT button may be extremely difficult or unsafe. For example, a police officer's hands may be occupied, and pushing the PTT button may be unsafe. Consider a situation where an officer needs to hold a rifle with both hands and needs to push an actual PTT button on their radio. Taking a hand off of the rifle may put the officer's life in danger. Therefore, a need exists for a method and apparatus for alleviating the above-mentioned unsafe condition.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for providing a virtual push-to-talk (PTT) button is provided herein. During operation, an augmented reality and object recognition circuitry will detect user's fingers and a free surface near the fingers by analyzing image captured by camera. A virtual PTT button is placed upon an object that is near to user's finger. Gesture recognition will be performed by the circuitry to determine if a user presses the virtual PTT button. When a user presses the virtual PTT button, the circuitry identifies the action and transmits a message to a PTT radio, causing the PTT radio to activate a PTT call.

Figure 1:
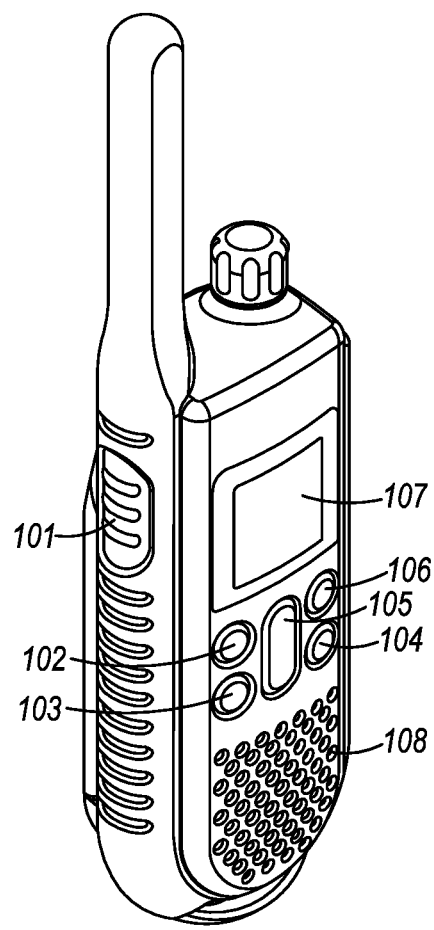
FIG. 1 illustrates a push-to-talk (PTT) radio.

FIG. 1 illustrates push-to-talk (PTT) radio 100. As shown, radio 100 comprises PTT button 101, user interface buttons 102-106, display/screen 107, and speaker 108. PTT button 101 comprises a standard button, that when pressed, transitions radio 100 from a listening state, to a transmit state. As discussed, PTT button 101 preferably comprises a proximity sensor or touch-sensitive surface, such as a touchpad for activating display 107. In some embodiments, the touchpad is a touch-sensitive area of the PTT button that unlike a touch screen, does not display visual output.

Interface buttons 102-106 serve as means for controlling and/or programming radio 100. More particularly, buttons 102-106 serve as a man-machine interface, and are used for controlling radio 100. In some PTT radio embodiments, these other buttons may not be present, and may be replaced with a touch display interface.

Display 107 comprises a way of conveying (e.g., displaying) PTT information to the user. In particular, in an embodiment, a talkgroup may be displayed to the user as an alpha-numeric output on display 107. Display 107 may simply comprise a liquid-crystal display (LCD), or may comprise additional types of displays (e.g., a light-emitting diode (LED) display). Display 107 may also comprise a touch-screen display that provides both an output interface and an input interface between the device and a user. Display 107 may also provide graphics, video, and any combination thereof. Some or all of the visual output may correspond to PTT information, further details of which are described below.

Speaker 108 comprises a standard speaker for outputting audio. More particularly, speaker 108 converts an electrical signal generated from an active application to human-audible sound waves.

As discussed above, oftentimes requiring an individual to push PTT button 101 may be extremely difficult or unsafe. For example, a police officer's hands may be occupied, and pushing the PTT button may be unsafe. Consider a situation shown in FIG. 2 where an officer needs to hold a rifle with both hands and needs to push PTT 101 button on their radio. Taking a hand off of the rifle may put the officer's life in danger.

Figure 3:
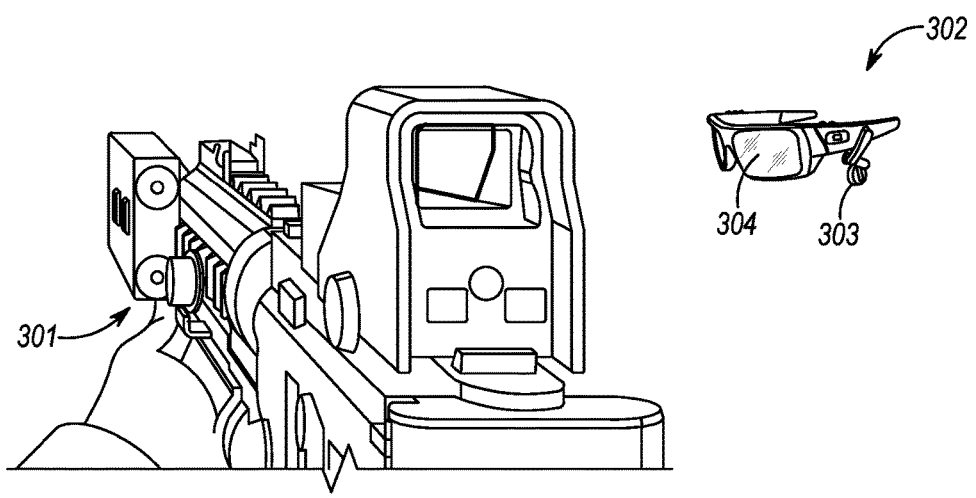
FIG. 3 illustrates a system employing a virtual PTT button.

In order to address this issue, a virtual push-to-talk (PTT) button 301 is provided, as shown in FIG. 3. During operation virtual PTT button 301 is placed upon an object that is near to user's finger. As shown in FIG. 3, virtual PTT button is placed on the side/surface of the rifle, near a user's thumb. Augmented-reality system 302 will be used to view and activate the PTT button. Gesture recognition will be performed by an augmented-reality system to determine if a user presses the virtual PTT button. When a user presses the virtual PTT button, the augmented-reality system identifies the action and transmits a message to a PTT radio, causing the PTT radio to activate a PTT call.

Figure 2:
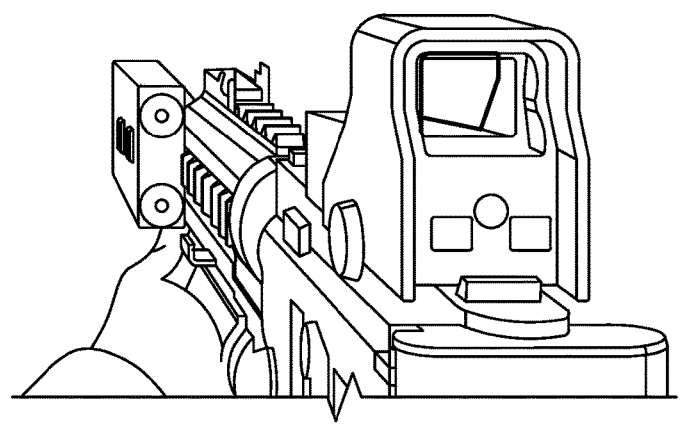
FIG. 2 illustrates an officer where it would be unsafe to push a PTT button.

Augmented-reality system 302 comprises camera 303 and display/projector combination 304. In one embodiment of the present invention system 302 takes the form of augmented-reality glasses. With this in mind, display 304 is preferably an eyeglass lens and projector combination so that virtual information is projected onto a lens of the glasses. Camera 303 is incorporated into the frame of the glasses. As is shown in FIG. 2, the real-world rifle does not have the virtual PTT button existing upon it. However, display 304 will show the rifle having virtual PTT button 203 upon it. Thus, as is obvious, the virtual PTT button is not visible unless viewed through display 304.

In alternate embodiments of the present invention, virtual PTT button 301 may be displayed not attached to any object. For example, virtual PTT button may be displayed as floating in the air, or simply in front of a person's field of view, near a finger. As is evident, for system 302 to be able to display virtual PTT button 301 attached to a particular object/surface, a system 302 must be capable of identifying the object's location, the user's hand, and then displaying the virtual PTT button at the object's location, near the user's hand.

Figure 4:
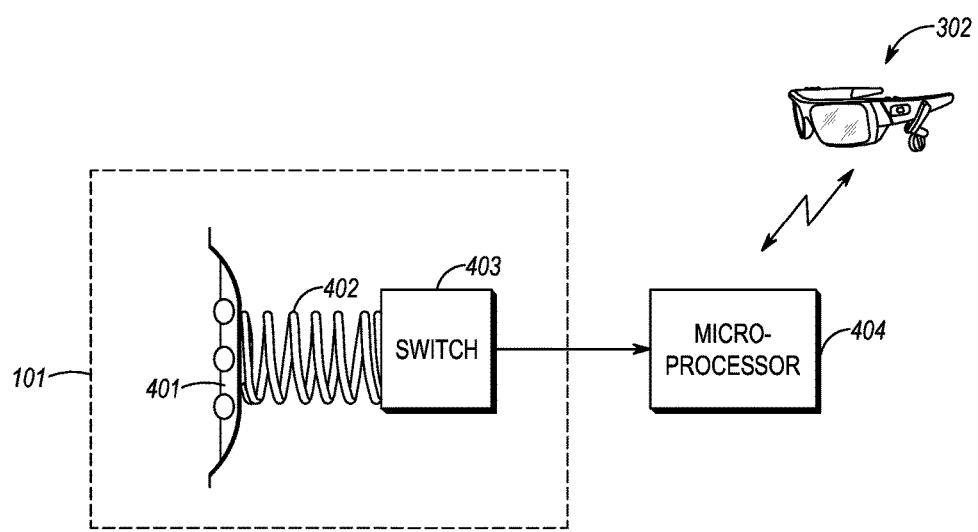
FIG. 4 is a more-detailed view of the system of FIG. 3.

FIG. 4 is a more-detailed view of the system of FIG. 3. As shown, PTT button 101 also comprises spring-actuated switch 403 so that the physical depressing (pressing) of plate 401 causes radio 100 to enter a half-duplex transmit state. Therefore, pressing plate 401 and compressing spring 402 will send a signal to microprocessor 404 causing radio 100 to enter ½ duplex mode of transmission. In addition to depressing plate 401, a wireless signal received by microprocessor 404 from augmented-reality system 302 will cause radio 100 to enter ½ duplex mode of transmission. Thus, when system 302 detects the pressing of virtual PTT button 301, system 302 will send a wireless signal to microprocessor 404 indicating that virtual PTT button 301 was pressed. As is evident, there exists actions that cause radio to enter ½ duplex mode transmission; a first action is simply pressing the actual PTT button, while a second action is "pressing" the virtual PTT button.

Figure 5:
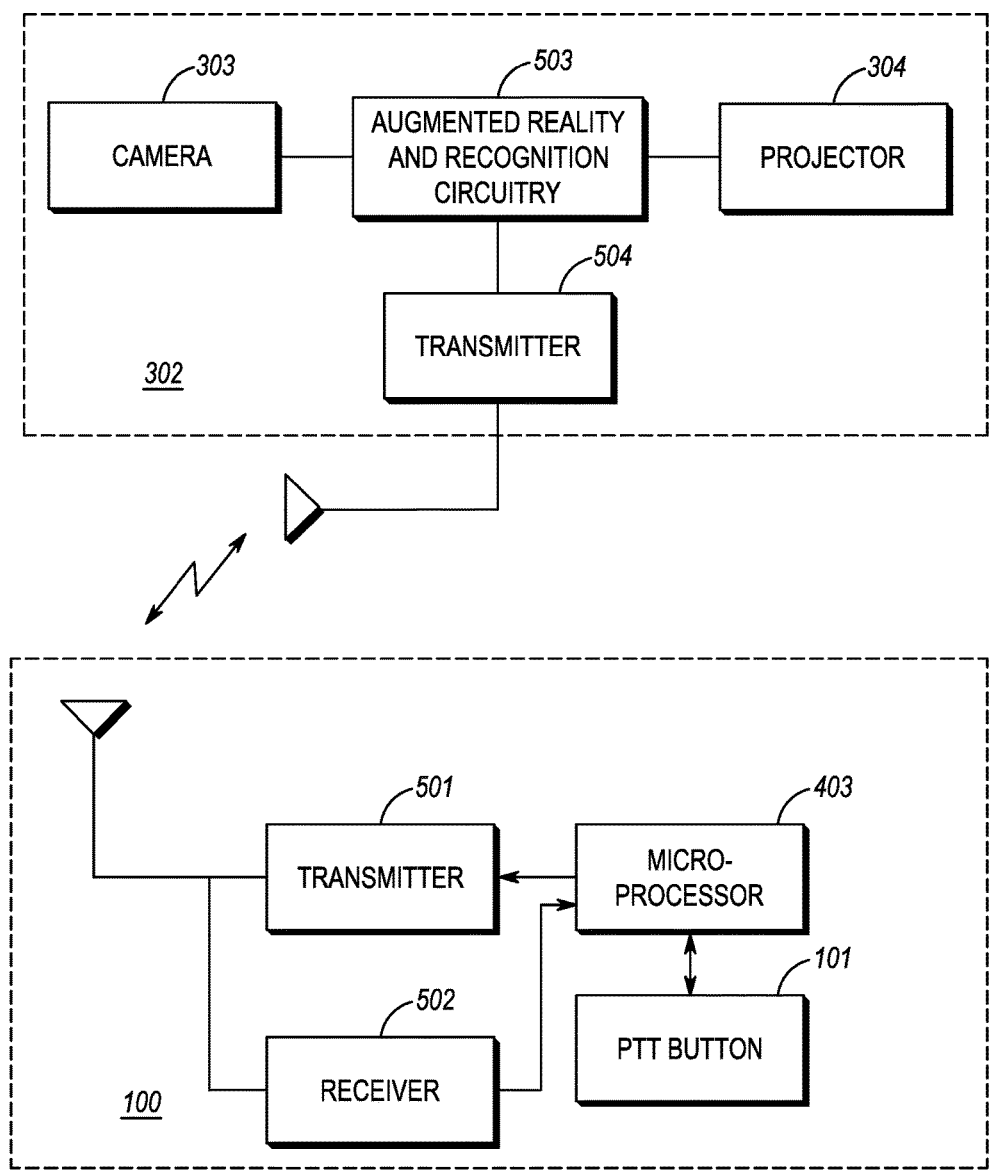
FIG. 5 is a more-detailed view of the system of FIG. 3.

FIG. 5 is a more-detailed view of the system of FIG. 3 and FIG. 4. In particular, FIG. 5 shows a more-detailed block diagram of augmented-reality system 302 and radio 100. As shown, radio 100 may include transmitter 501, receiver 502, logic circuitry (processor) 403, and PTT button 101. In other implementations, radio 100 may include more, fewer, or different components. For example, for simplicity, a microphone is not shown in FIG. 5, however one of ordinary skill in the art will recognize that radio 100 comprises a microphone for receiving a user's voice.

Transmitter 501 and receiver 502 may be well known long-range and/or short-range transceivers that utilize the Bluetooth™ communications system protocol, a private 802.11 network set up by a building operator, a next-generation cellular communications network operated by a cellular service provider, or any public-safety network such as an APCO 25 network or the FirstNet broadband network. Transmitter 501 and receiver 502 may also contain multiple transmitters and receivers, to support multiple communications protocols simultaneously. For example, transmitter 501 and receiver 502 may support both an APCO 25 transmission protocol for long-range communications, while using the Bluetooth™ communication system protocol to support short-range communications.

Logic circuitry 403 comprises a digital signal processor (DSP), general purpose microprocessor, a programmable logic device, an Application Processor, or application specific integrated circuit (ASIC) and is utilized to determine when to enter a ½ duplex mode transmission scheme.

Augmented-reality system 302 comprises camera 303, augmented reality and recognition circuitry 503, display 304, and transmitter 504. Camera 303 captures a sequence of video frames (i.e., a sequence of one or more still images in a digital format). The images or video captured by camera 303 may be stored in a storage component (not shown), or may be sent directly to circuitry 503. Display 304 preferably comprises a projector/screen combination where the projector a virtual PTT button onto the screen in an appropriate position so that the virtual PTT button lies on a surface near a user's hand.

Transmitter 504 preferably comprises a short-range transmitter that utilizes the Bluetooth™ communications system protocol. Transmitter 501 transmits a notification to radio 100 when the virtual PTT button has been pressed by the user.

Finally, augmented reality and recognition circuitry 503 comprises a digital signal processor (DSP), general purpose microprocessor, a programmable logic device, an application Processor, or application specific integrated circuit (ASIC). Circuitry 503 is utilized/configured to determine the existence of a user's hand/fingers, determine a surface, and instruct display 304 to project a virtual PTT button on the surface near the user's hand/fingers. In addition, circuitry 503 also uses gesture recognition to detect when the user "presses" the virtual PTT button.

During operation of system 302, camera 303 provides an image to circuitry 503. Circuitry 503 determines the existence of a user's hand and a surface near the user's hand. Circuitry 503 then instructs display 304 to display (i.e., project onto a screen) the virtual PTT onto the surface near the user's hand. Circuitry 503 also uses gesture recognition to determine if a user's hand/finger/thumb has come in contact (pressed) the virtual PTT button. This may simply be accomplished by determining if the virtual PTT button and any part of the user's hand occupy a same physical space. If it has been determined that the user has pressed the virtual PTT button, circuitry 503 instructs transmitter 504 to transmit a PTT message to radio 100 indicating that the virtual PTT button has been pressed.

The PTT message is received by receiver 502 and passed to logic circuitry 403. Logic circuitry 403 is configured to determine if a PTT message has been received, and to determine if PTT button 101 has been pressed. Both of these situations will cause microprocessor to instruct transmitter 501 to enter a ½ duplex mode of operation.

Figure 6:
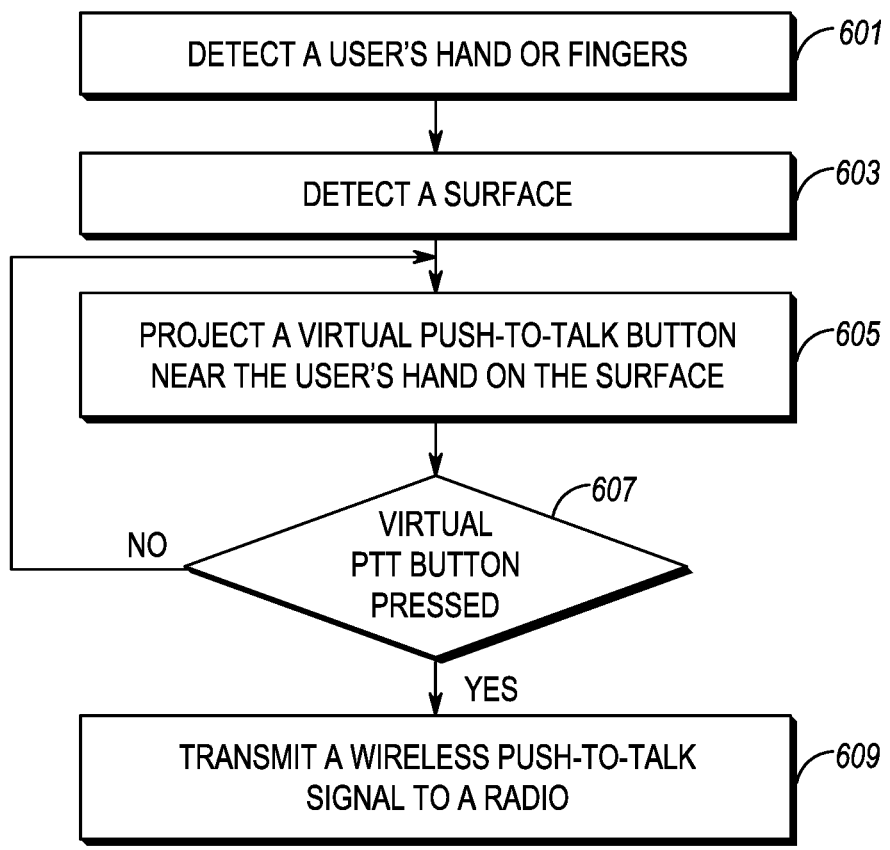
FIG. 6 is a flow chart showing operation of the augmented-reality system of FIG. 3, FIG. 4, and FIG. 5.

FIG. 6 is a flow chart showing operation of the augmented-reality system of FIG. 3, FIG. 4, and FIG. 5. As discussed above, system 302 comprises projector 304 configured to project a virtual push-to-talk button on a surface near a user's hand, a transmitter 504, and circuitry 503 configured to detect when a user presses the virtual push-to-talk button and instruct the transmitter to transmit a wireless push-to-talk signal to a radio upon the detection that the user has pressed the virtual push-to-talk button.

The logic flow begins at step 601 where circuitry 503 detects a user's hand or fingers, and detects a surface (step 603), At step 605, circuitry 503 instructs projector 304 to project a virtual push-to-talk button near the user's hand on the surface. Circuitry 503 detects when the user presses the virtual push-to-talk button (step 607), and instructs transmitter 504 to transmit a wireless push-to-talk signal to a radio upon the detection that the user has pressed the virtual push-to-talk button (step 609).

Figure 7:
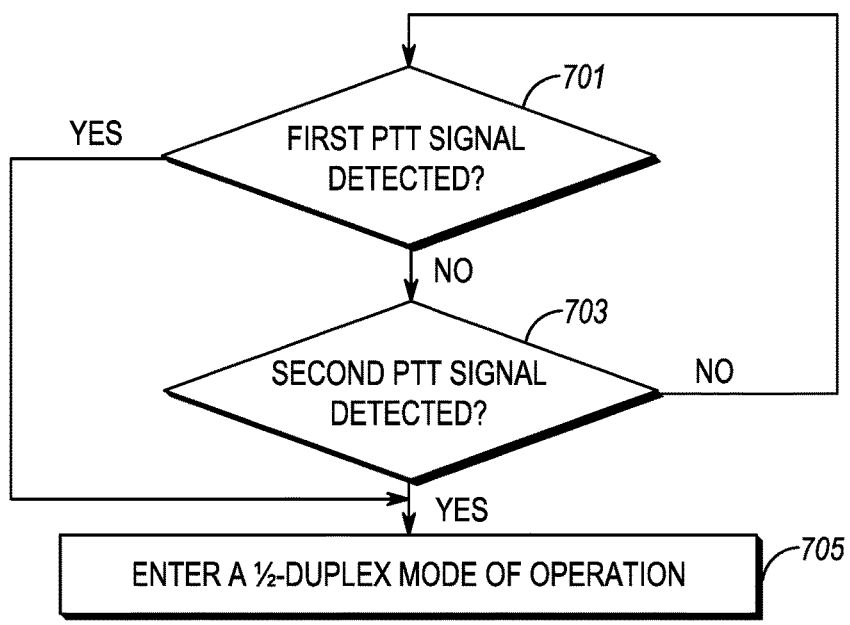
FIG. 7 is a flow chart showing operation of the PTT radio of FIG. 3, FIG. 4, and FIG. 5.

FIG. 7 is a flow chart showing operation of the PTT radio of FIG. 3, FIG. 4, and FIG. 5. As discussed above, the radio of FIG. 3, FIG. 4, and FIG. 5 comprises a first button 101 configured to transmit a first push-to-talk signal to logic circuitry 403 upon the pressing of the first button. The radio also comprises a wireless receiver configured to receive a wireless push-to-talk signal and to transmit a second push-to-talk signal to circuitry 403. It should be noted that the second push-to-talk signal may simply comprises a message received from augmented-reality system 302 that indicates a virtual push-to-talk button has been pressed. The radio also comprises a transmitter 501. Circuitry 403 is configured to receive the first push-to-talk signal from the first button, and to receive the second push-to-talk signal from the receiver, and to instruct the transmitter to enter a ½-duplex mode of operation upon the reception of the first or the second push-to-talk signals.

During operation circuitry 403 determines if a first push-to-talk signal is detected from a first button (step 701), determines if a second push-to-talk signal is detected from a receiver (step 703), and instructs a transmitter to enter a ½-duplex mode of operation upon the detection of the first or the second push-to-talk signals (step 705). As discussed above, the second push-to-talk signal is generated by the receiver in response to the reception of an over-the-air push-to-talk signal received from an augmented-reality system detecting a pressing of an virtual push-to-talk button.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An augmented-reality system comprising:
   circuitry configured to detect a location of a user's hand or fingers;
   a projector configured to project a virtual PTT button onto eyeglasses, and in a position so that the virtual PTT button appears at a location based on the location of the user's hand or fingers, wherein the virtual PTT button is not visible unless viewed through the eyeglasses;
   a transmitter; and
   the circuitry configured to detect when a user presses the virtual PTT button and instruct the transmitter to transmit a PTT signal to a radio upon the detection that the user has pressed the virtual push-to-talk button.

2. The system of claim 1 wherein the push-to-talk signal causes the radio to enter a ½-duplex mode of operation.

3. A method comprising the steps of:
   detecting a location of a user's hand or fingers;
   projecting a virtual PTT button onto eyeglasses, the virtual PTT button projected at a position so that the virtual PTT button appears at a location based on the location of the user's hand or fingers, wherein the virtual PTT button is not visible unless viewed through the eyeglasses;
   detecting when the user presses the virtual push-to-talk button; and
   transmitting a wireless push-to-talk signal to a radio upon the detection that the user has pressed the virtual push-to-talk button.

4. The method of claim 3 wherein the push-to-talk signal causes the radio to enter a ½-duplex mode of operation.

* * * * *